(12) United States Patent
Bonnell

(10) Patent No.: US 11,528,138 B2
(45) Date of Patent: Dec. 13, 2022

(54) METHODS AND SYSTEMS FOR A DIGITAL TRUST ARCHITECTURE

(71) Applicant: United States Postal Service, Washington, DC (US)

(72) Inventor: Clayton C. Bonnell, Fairfax, VA (US)

(73) Assignee: United States Postal Service, Washington, DC (US)

( * ) Notice: Subject to any disclaimer, the term of this patent is extended or adjusted under 35 U.S.C. 154(b) by 52 days.

(21) Appl. No.: 17/308,857

(22) Filed: May 5, 2021

(65) Prior Publication Data
US 2021/0258161 A1    Aug. 19, 2021

Related U.S. Application Data

(60) Continuation of application No. 16/428,831, filed on May 31, 2019, now Pat. No. 11,153,086, which is a
(Continued)

(51) Int. Cl.
*H04L 9/32* (2006.01)
*G06F 21/62* (2013.01)
(Continued)

(52) U.S. Cl.
CPC ............ *H04L 9/32* (2013.01); *G06F 21/6245* (2013.01); *H04L 9/006* (2013.01); *H04L 9/0861* (2013.01); *H04L 9/3239* (2013.01); *H04L 9/3247* (2013.01); *H04L 9/3268* (2013.01); *H04L 63/0442* (2013.01); *H04L 9/50* (2022.05); *H04L 63/123* (2013.01)

(58) Field of Classification Search
CPC ...................................................... H04L 9/32
See application file for complete search history.

(56) References Cited

U.S. PATENT DOCUMENTS

| 6,088,717 A | 7/2000 | Reed et al. |
| 6,529,908 B1 | 3/2003 | Piett et al. |

(Continued)

FOREIGN PATENT DOCUMENTS

WO    WO 2015/183783 A1    12/2015

OTHER PUBLICATIONS

International Search Report and Written Opinion dated Jan. 17, 2018 for International Patent Application PCT/US2017/52258.
(Continued)

*Primary Examiner* — Bradley W Holder
(74) *Attorney, Agent, or Firm* — Knobbe Martens Olson & Bear LLP

(57) ABSTRACT

In some aspects, methods and systems for a digital trust architecture are provided. In some aspects, the architecture includes a user account provisioning process. The provisioning process may make use of in person verifications of some personal information to ensure authenticity of the user information. Once the authenticity of user information is established, an account may be created. The user account may include a user email account, with integrated access to digital certificates linked to the user account. Account creation may also automatically publish the new user's public key in a publicly accessible directory, enabling encrypted email information to be easily sent to the new user.

12 Claims, 8 Drawing Sheets

Related U.S. Application Data division of application No. 15/709,266, filed on Sep. 19, 2017, now Pat. No. 10,419,218.

(60) Provisional application No. 62/397,282, filed on Sep. 20, 2016.

(51) Int. Cl.
*H04L 9/00* (2022.01)
*H04L 9/08* (2006.01)
*H04L 9/40* (2022.01)

(56) References Cited

U.S. PATENT DOCUMENTS

| | | | |
|---|---|---|---|
| 8,042,163 B1 | 10/2011 | Karr et al. | |
| 8,286,221 B2 | 10/2012 | Muller et al. | |
| 8,346,929 B1 | 1/2013 | Lai | |
| 8,423,437 B2 | 4/2013 | Benisti et al. | |
| 8,862,181 B1 | 10/2014 | Cope et al. | |
| 2002/0065695 A1 | 5/2002 | Francoeur et al. | |
| 2002/0078346 A1* | 6/2002 | Sandhu | H04L 9/3273 713/156 |
| 2004/0260698 A1* | 12/2004 | MacMillan | G06F 21/6227 707/999.009 |
| 2006/0021018 A1 | 1/2006 | Hinton et al. | |
| 2006/0026418 A1 | 2/2006 | Bade et al. | |
| 2006/0080195 A1 | 4/2006 | Karabulut | |
| 2007/0072564 A1 | 3/2007 | Adams | |
| 2007/0101419 A1* | 5/2007 | Dawson | G06F 21/32 726/9 |
| 2007/0136178 A1 | 6/2007 | Wiseman et al. | |
| 2008/0104411 A1 | 5/2008 | Agrawal et al. | |
| 2009/0103702 A1 | 4/2009 | Allen et al. | |
| 2009/0132490 A1 | 5/2009 | Okraglik | |
| 2010/0115266 A1 | 5/2010 | Guo et al. | |
| 2013/0297333 A1* | 11/2013 | Timmons | G16H 20/10 705/2 |
| 2015/0095352 A1 | 4/2015 | Lacey | |
| 2015/0326543 A1 | 11/2015 | Pochuev et al. | |
| 2017/0046526 A1 | 2/2017 | Chan et al. | |
| 2017/0324738 A1 | 11/2017 | Hari et al. | |
| 2017/0346639 A1 | 11/2017 | Muftic | |
| 2018/0007131 A1 | 1/2018 | Cohn et al. | |

OTHER PUBLICATIONS

International Preliminary Report on Patentability dated Mar. 26, 2019 for International Patent Application No. PCT/US2017/052258.

Josang et al.; Trust requirements in identity management; Published in: Proceeding ACSW Frontiers '05 Proceedings of the 2005 Australasian workshop on Grid computing and e-research; vol. 44 pp. 99-108; ACM Digital Library (Year: 2005).

Schmidt et al. Deco Arch: Trust and Reputation Aware Service Brokering Architecture in Digital Ecosystems; Published in: 2007 Inaugural IEEE-IES Digital EcoSystems and Technologies Conference; Date of Conference: Feb. 21-23, 2007; IEEE Xplore (Year: 2007).

* cited by examiner

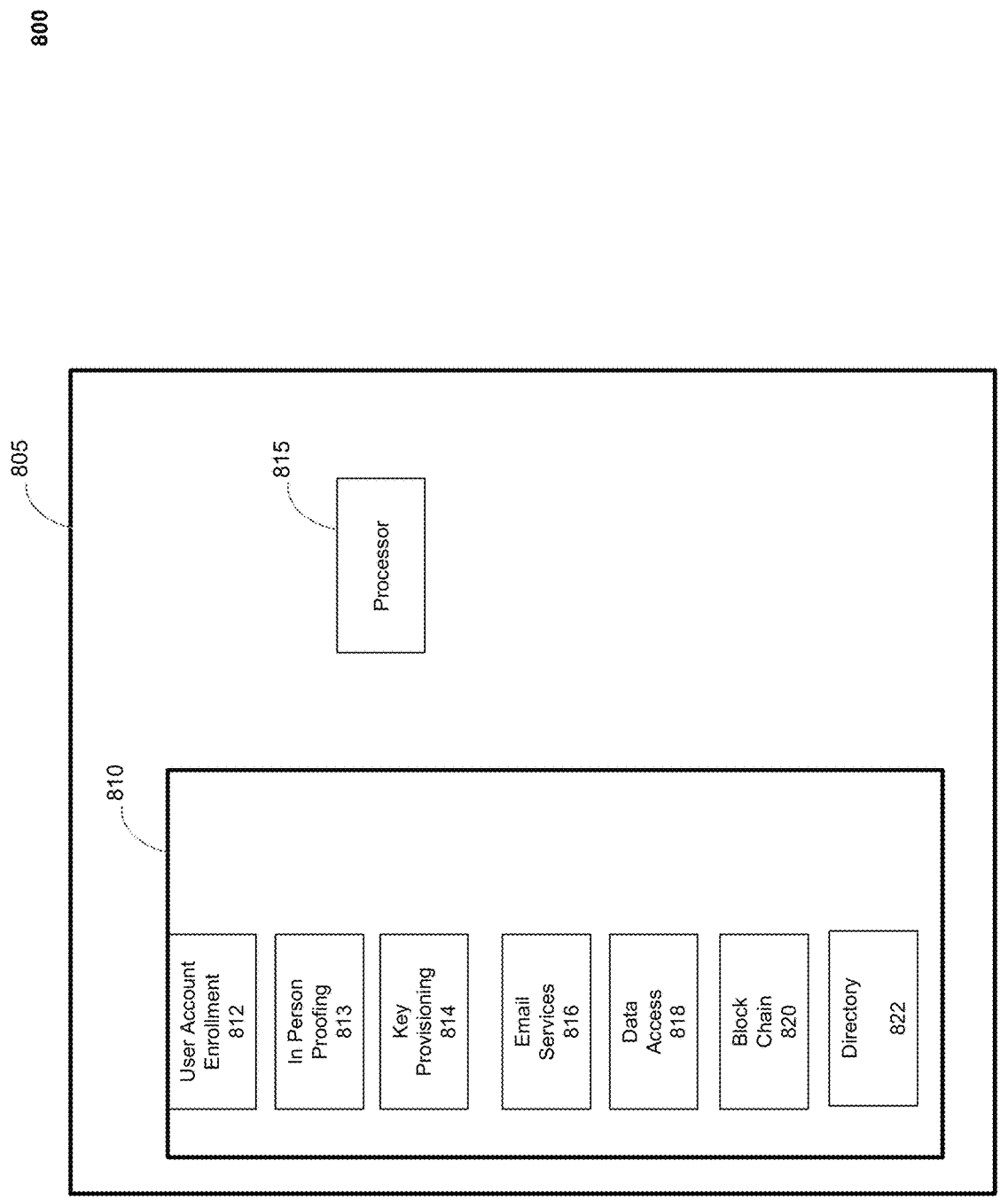

METHODS AND SYSTEMS FOR A DIGITAL TRUST ARCHITECTURE

CROSS REFERENCE TO RELATED APPLICATIONS

This Application is a continuation application of U.S. application Ser. No. 16/428,831, filed May 31, 2019, which is a divisional application of U.S. application Ser. No. 15/709,266, filed Sep. 19, 2017, which claims the benefit of U.S. Provisional Application No. 62/397,282, filed Sep. 20, 2016, assigned to the assignee hereof. The disclosure of these prior applications is considered part of this application, and all are hereby incorporated by reference in their entirety.

BACKGROUND

Field

This disclosure relates to digital data security, and in particular, to provisioning a secure digital infrastructure to provide secure messaging and authentication services.

Description of the Related Art

As more of life's daily interactions move to online activities, it is apparent that the tools that provide trust to the users are lacking in their ability to adequately provide a desired level of security. Tools that have evolved from physical interactions, like face-to-face communication, and the ability to "go there" to resolve issues, are not possible in a digital environment. Users of digital transactions in general may have several concerns, including a lack of confidence that the true parties to a transaction are known, an inability to know if a transaction has been tampered with, and uncertainty that the communication channel is secure. These shortcomings are largely the results of an environment having no consistent architecture designed for establishing an enforceable trust in a digital environment.

There are many excellent reasons for online interactions to continue as they have been. However, in a multi-party, open source environment, there is also a need for a secure, trusted, and enforceable online environment, to enable greater trust and therefore expansion of offerings online.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include data authentication services.

One aspect disclosed herein comprises a system implementing a digital trust architecture. The system comprises a user account enrollment and verification component, a key provisioning component, a user email component, a data access component, and a block chain component. The user account enrollment and verification component may receive, from a network, user identity information from a user computer and receive additional user identity information over a network from an in person verification system The user account enrollment and verification component may further verify a user account based on the user identity information and the additional user identity information and provision a user account based on the verification and the user identity information. The key provisioning component may be configured to generate a public and private key for the user account. The user email component may be configured to generate an email from the user, sign the email using the private key, and transmit the email over a network to a recipient computer. The data access component may be configured to select sensitive data, grant permission to access the sensitive data, and revoke access to sensitive data. The block chain component may be configured to receive records from the user and add the records to a block chain.

In some aspects, the user email component of the system is further configured to receive input identifying the recipient and input indicating email body data, search the database accessible to the public for a public key associated with the recipient, encrypt the email body data using the public key associated with the recipient, and transmit the encrypted email body data to the recipient.

In some aspects, the user email component is further configured to receive input indicating whether information indicating the transmission of the encrypted email body data is to be stored in a block chain and store the information in a block chain in response to the input.

In some aspects, the user email component is further configured to receive visibility input indicating whether the information stored in the block chain is publicly accessible and setting access privileges of the block chain in response to the visibility input.

In some aspects, the key provisioning component is further configured to selectively publish the public key to a directory database accessible to the public based on configuration information. In some aspects, the system further comprises an in person proofing component. The in person proofing component is configured to receive at least a portion of the user identity information from the user account enrollment and verification component and generate a prompt for additional user identity information. The in person proofing component is further configured to receive input from an input device indicating the additional user identity information and transmit the additional user identify information to the user account enrollment and verification component.

In some aspects, wherein the data access component is further configured to generate a digital signature for the selected sensitive data, wherein revoking access to the sensitive data comprises invalidating the digital signature.

In some aspects, the user email component is further configured to attach the records to the email message, and the distributed ledger component is further configured to add the email message to the block chain.

Another aspect includes a system for authenticating access to personal information. The system comprises a user data stored in a non-volatile electronic memory and one or more electronic hardware processors. The one or more electronic hardware processors may be configured to implement a digital certificate provider, configured to digitally sign the user data and generate a digital certificate based on the digital signature and a data broker, the data broker configured to conditionally provide access to the user data upon request based on the digital certificate.

In some aspects, the data broker is further configured to revoke access to the user data based on reception of a revoke message and to deny further requests for access to the user data based on the reception of the revoke message. In some aspects, the system further comprises a user computer configured to provide the digital certificate to a network application, wherein the data broker is configured to receive requests for access to the user data from the network application. In some aspects, the user computer is further configured to provide the user data to the network application. In some aspects, the network application is configured to delete local copies of the user data in response to receiving a response to a request for access indicating access to the user data is denied.

An additional aspect includes a method of implementing a digital trust architecture. The method includes receiving, from a network, user identity information from a user computer and receiving additional user identity information over the network from an in person verification system. The method also includes verifying a user account based on the user identity information and the additional user identity information, provisioning a user account based on the verification and the user identity information, and generating a public and private key for the user account. The method also further includes generating an email from the user, signing the email using the private key, and transmitting the email over a network to a recipient computer. The method further includes selecting sensitive data, granting permission to access the sensitive data, and revoking access to sensitive data. The method further also comprises receiving records from the user and adding the records to a block chain.

In some aspects, the method further comprises receiving input identifying the recipient and input indicating email body data, searching a database accessible to a public for a public key associated with the recipient, encrypting the email body data using the public key associated with the recipient, and transmitting the encrypted email body data to the recipient.

In some aspects, the method further comprises receiving input indicating whether information indicating the transmission of the encrypted email body data is to be stored in a block chain and storing the information in a block chain in response to the input.

In some aspects, the method further comprises receiving visibility input indicating whether the information stored in the block chain is publicly accessible and setting access privileges of the block chain in response to the visibility input.

In some aspects, the method further comprises selectively publishing the public key to a directory database accessible to a public based on configuration information. In some aspects, the method further comprises receiving at least a portion of the user identity information, generating a prompt for additional user identity information, receiving input from an input device indicating the additional user identity information, and transmitting the additional user identify information.

In some aspects, the method further comprises generating a digital signature for the selected sensitive data, wherein revoking access to the sensitive data comprises invalidating the digital signature. In some aspects, the method further comprises attaching the records to the email message and further comprising adding the email message to the block chain.

BRIEF DESCRIPTION OF THE DRAWINGS

These drawings and the associated description herein are provided to illustrate specific embodiments of the invention and are not intended to be limiting.

FIG. 8 is a structured block diagram of a computer system implementing one or more of the exemplary embodiments disclosed herein.

DETAILED DESCRIPTION

Figure 1:
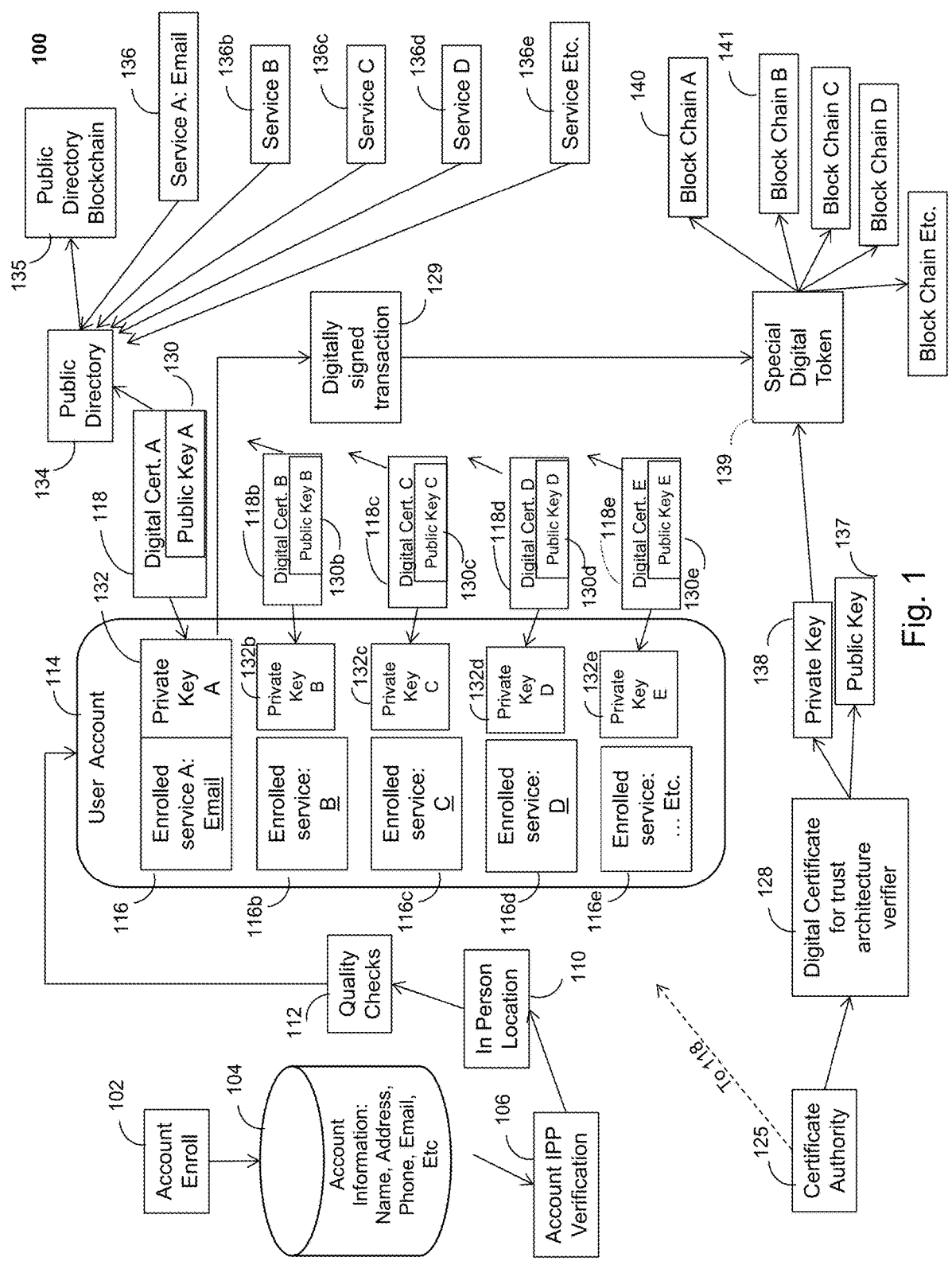
FIG. 1 shows an overview block diagram and data flows for an exemplary digital trust architecture.

Disclosed are methods and systems for a digital trust architecture. In the past, communicating and conducting transactions with remote parties was very difficult. People often could not physically go to where they needed to go to conduct a transaction, so they gave their messages, money, or goods to others to enable their transactions. Sometimes, that process was successful. Other times, however, it was not. One feature that enhanced whether the process was successful or not was whether there was an enforceable trust mechanism. The disclosed methods and systems provide an enforcement trust mechanism that has been missing from previous solutions. The disclosed systems and methods enable secure, end to end encrypted email and similar digital or electronic communications. This enables a high level of trust in the integrity of digital content. The disclosed methods and systems further enable a high level of trust in the parties involved in the digital communications. For example, via the use of digital signatures using public and private keys, users can be sure that the parties they interact with when using the systems are actually who they claim to be. Furthermore, transmissions are secured via audit functions in some aspects. The disclosed methods and systems provide many benefits when compared to existing solutions. For example, existing service-centric architectures may encompass many independent components that may not have been designed to facilitate integration with each other. Therefore, these systems require significant resources to utilize the various components in an integrated and more effective manner. These existing systems may also include functional gaps between the independent components. These functional gaps result in potential points of failure. In some cases, these gaps introduce or expose exploitable security gaps.

As one example, current identity services are restricted to a single issuing entity, which requires multiple "ID's" for a user to be able to use different services. Discovering the appropriate account for the user to use with a particular service may be burdensome. In contrast, the disclosed methods and systems provide a process that allows users to manage their digital identities for various services in a coherent and cohesive manner.

As a second example, current identity service providers may be active parties in every relationship using their services. Users of the service may be frequently unable to restrict the use of the attributes collected by the service provider. This results in reduced privacy and loss of control of attributes exposed during various enrollments with various providers. In contrast, the disclosed methods and systems provide mechanisms for users to manage access to data collected by a service provider.

As a third example, users may not be able to easily change their service provider(s) without losing their digital identity in existing systems. This leads to user's being essentially bound to the provider(s). The lack of user mobility suppresses true competition between providers, resulting in reduced customer service and responsiveness. The disclosed methods and systems provide improved service portability for users.

As one last example, some aspects of the disclosed methods and systems combine an "in person" verification, a user email account, and digital signature capability. Thus, the system can confirm a legitimate user that is attempting to open a legitimate email account is actually who they say they are (via the in-person verification). The digital signatures may ensure that an email indicating it is generated by the legitimate user is actually transmitted by the legitimate user, and its contents have not been altered. Thus, the system can generate email messages that can be received with a high confidence that the email was actually sent by the legitimate user. In contrast, with existing email systems lacking any type of in person verification process, opening an email account in another user's name is fairly straight forward, introducing potential for fraud. Furthermore, in systems that do not provide an email capability integrated with digital signatures, a malicious user may masquerade as a legitimate user by transmitting emails indicating the email is transmitted by the legitimate user. With the existing systems, even if an email appears to have come from the legitimate user's email account, the email may have actually been sent from a completely separate server unassociated with the legitimate user, with the separate server acting under the control of the malicious user. Thus, the disclosed methods and systems provide numerous benefits when compared to existing solutions. While much of the discussion herein focuses on e-mail, the systems and methods may apply to other electronic or digital communication.

One feature of the Digital Trust Architecture innovation is how digital certificates are used. Digital certificates may be difficult to use. For example, getting them recorded and revoked in a timely manner is one noted drawback, which inhibits use and can expose parties to risk after breaches have been discovered.

However, using a distributed ledger using block chain technology, as described herein, can mitigate some of the difficulties and drawbacks. Instead of verifying a digital certificate by verifying the validity of the digital signature of the associated certificate authority as stored in a browser (which is only updated when the browser is updated), a X.509 compliant digital certificate (and associated public key and attributes) could be recorded in a permissioned distributed ledger by a certificate authority. The entries in the ledger would be made unalterable through the use of block chain technology, where blocks of data are periodically cryptographically hashed along with the hash of preceding transactions. The digital certificate and related attributes (including public key) made publicly available for read only access by those needing to use it in public directory formed by the distributed ledger. In that way, the information can be quickly recorded in an unalterable way, and be made widely available within minutes, instead of days or more as is common today.

More importantly, the process of revoking a digital certificate in current systems is more troublesome, requiring constant vigilance of a certificate authorities "certificate revocation list" (CRL). The current process is very tedious and time consuming. Because certificates are frequently cached, even regularly maintained CRL's can have long periods between updating in remote computer servers and browsers. This is troublesome because it allows significant time to elapse between discovery of a breached certificate and the point when it is recognized as being no longer valid. Recording revoked digital certificates—or more accurately, recorded the status of a digital certificate as expired—in a public directory based on a distributed ledger would instantly make it known that the revoked certificate is no longer valid. These difficulties and drawbacks are also overcome by the systems and methods described herein.

FIG. 1 shows an overview block diagram and data flows for an exemplary digital trust architecture 100. The digital trust architecture 100 includes an account enrollment process 102. The account enrollment process may solicit identifying information from an individual, such as their name, address, phone number, and the like. This information may be stored in a user database 104. In some aspects, the user's information may be received via a web site, or in some aspects, via paper based forms that may be mailed or delivered in person to an office location. The information presented may be directly entered by the user or by other personnel via a computer system interface such as a web application, or via paper based forms containing user's information. These forms may be scanned via a digital scanner that includes optical character recognition. The information may then be extracted from the form. The resulting digital data may then be stored in the user database 104.

The account enrollment process 102 may also utilize an in person proofing (IPP) process 106 to verify prospective account holder information. The in IPP process 106 may provide a higher lev\el of security for the account enrollment process, in that the IPP process 106 requires a human user applying for the user account to interact with a representative of an organization responsible for the digital trust architecture. This interaction may be done through virtual means, such as via a live telecommunication session, such as a "web chat" session or through a proctored kiosk session, or it may be conducted in the physical presence of an enrolling (or similar) agent for higher certainty. During the in person interaction, at least some identification is provided verifying that the human user is who they claim to be and that the individual appearing at the in person interaction is properly associated with the information provided for the user account being established by the account enroll process 102. In some aspects, the account enrollment process 102 may enable the user to select the method and location of how they prefer to perform the IPP process 106, whether they prefer to use a virtual session, visit an office location 110, or whether a representative of the organization maintaining the system 100 visits them at a location 110 of their choosing. In some aspects, the IPP process 106 may take place at a location 110 of the user's choosing, such as on their front porch, a lobby of their place of employment, or a public place such as a coffee shop. These in person verifications may be conducted by a mobile representative of the organization maintaining the system 100. In some aspects, the system 100 may provide an ability for the user to print the information already entered into the system during the account enrollment process 102. The hardcopy may also include one or more enrollment codes, in some aspects represented by a barcode or other machine readable format, which may identify the particular user verification transaction at the in person location 110. In other aspects, users may prefer a message be sent to their mobile device that contains a unique identifier in a machine readable format such as a "QR code". The QR code or the hardcopy enrollment verification form can be presented to verify information and associations.

In some aspects, the account enrollment process 102 may also store selected information from the user database 104 to a separate database (not shown) accessible by the office location 110. This may enable the IPP process 106 to access the information during the IPP process 106 without requiring direct access to the user database 104.

The IPP process 106 may collect one or more of biometric information (such as a fingerprint, iris scan, or other biometric information), or other identifying information, such as a birth certificate, driver's license, government issued identification, or the like. In some aspects, biometric data may be collected for account reset purposes. Some examples of when this would be useful are when a digital credential is lost due to device failure; loss of a device including the digital credential (e.g., a smartphone lost overboard); a personal computer and paper records are lost due to natural disaster; or recovery from an unauthorized account take over.

In some aspects, data from the identification provided in person may be input (manually or through the use of a barcode scan) to the user database 104 in an IPP process 106. Other information, such as the location 110 of the in person verification, a name or identifier of an employee conducting the in person identification, etc. may also be recorded to the user database 104 by the IPP process 106. After the account IPP process 106 verifies the user's identity, the quality check process 112 may further review data associated with the user's account. The quality check process 112 may include a random verification and may include an electronic transaction verification. The electronic transaction verification may include mailing an article such as a postcard with an included barcode or other identifying sequence number to a physical address of record in the user database 104. Upon receipt at the physical address, the user may scan the barcode with an application on their mobile device, or enter the sequence number into the system 100 to verify they are present at the address and interested in continuing use of the service.

After the quality check process 112 is complete, a user account 114 may be created and activated. The account 114 may include one or more enrolled services, such as an email account 116 and its associated digital certificate 118. The digital trust architecture of FIG. 1 also includes other services 116b-116e for each if which digital certificate issuance and a public key infrastructure may be used. Each service may be independent of other services and therefore may use a separate digital certificate. Examples of such services are secure email messaging, message and file encryption, digital signatures, digital payments, a secure Caller ID service, and online voting. As shown, the digital trust architecture 100 interfaces with a certificate authority 125. The certificate authority 125 may provide a digital certificate 118 based on the user information stored in the user database 104 for the user account 114. Because the certificate 118 is provided to the user as the result of an authentication process, it may have many advantages. One advantage is the creation of a public directory or directories.

An authoritative public directory has many advantages to enhance digital activities. The user's digital certificate 118 may be utilized to reference two keys, a public key 130 and a private key 132, held by the user. The public key 130 may be stored in a public directory 134. The public directory 134 may include a physical memory for storing information, such as a public key 130 and its attributes. The public directory 134 may also include an electronic processor configured to perform functions associated with storing and retrieving information from the physical memory, such as functions to store and retrieve the public key 130. In some aspects, the public directory 134 may be a domain name service (DNS) directory, to facilitate inquiry and retrieval of related records. In some aspects, Domain Authenticated Name Extension (DANE) may be utilized to securely identify exactly which TLS/SSL digital certificate 118 an application or service should use to access your account. The public directory 134 may be used to store the public key to be used to verify enrolled services through the use of special digital tokens. In some aspects, services 136 may utilize the public key 130 to authenticate the service usage. In some aspects, the public directory 134 may also store public key 130 for use in securing email transactions. In some aspects, the public directory 134 may permit interoperability between different identifiers; for example, use email address to be cross-referenced for shipping. In some aspects, the public directory 134 may use block chain 135 to record and store user digital certificates 118, public keys 130, attributes 104, or other identifier or qualifiers.

Once the email account 116 is established, a first email user (sender) may be able to lookup a second email user's (recipient's) email address in the public directory 134. The lookup may occur by providing one or more identifiers or pieces of personal information for the recipient relating to the email service 136. This may include, for example, name, phone number, postal address or the like. Once the recipient is located in the public directory 134, the email address and the public key 130 may be provided to the sender as part of a results set for the lookup operation. In some aspects, use of the public directory 134 may mitigate email "phishing" attacks, where impostors trick email recipients into opening and possibly responding to malicious email messages.

The public key may be used to encrypt email data. As the data is encrypted using the recipient's public key, the recipient will be able to decrypt the email data with the private key 132, which is known only to the recipient. An email is then generated, and digitally signed by the sender's private key. Since the sender is the only party with knowledge of the private key, successful decryption of the email via the sender's public key provides verification that the sender created the email.

In some aspects, publication of a user's email address and/or public key in the public directory 134 may be accomplished using a configuration setting controllable by the user. In some aspects, multiple levels of access may be configured. In some aspects, data available for a user in the public directory 134 may be set to "share with anyone," or "request authorization before sharing" for example.

In some aspects, the digital certificate 118 may also be used to verify other electronic transactions or files in the same manner, serving to trace those transactions back to the authenticated user account 114. The Certificate Authority 125 may issue a digital certificate 128 to the operator, or verifier, of the trust architecture, which will identify the public key 137 related to the private key 138 used by the verifier. User account 114 will use the private key 132 related to the service to digitally sign 129 the related transaction. The trust architecture verifier uses its private key 138 to sign the user's signature 129 to create a special digital token 139. The token 139 is used to create a record for the user for inclusion in a block chain 140, as described below. Also in some aspects, the block chain 140 may be implemented as a distributed ledger. In some aspects, the system 100 may provide configuration setting that enables the special digital token 139 be sent to one or more specified block chains, to ensure proper registration due to subject matter. For example, at the completion of an automobile sale, a special digital token 139 may be generated and a copy sent to a cryptocurrency block chain A 140 to record transfer of funds, and another copy sent to an assets block chain B 141 to record the transfer of title. In some aspects, the system 100 may include a rules engine that provides for similar recording and adding of an email to a block chain or block chains under particular conditions. For example, certain recipients and/or keywords cause emails to be stored to one or another block chain.

The block chaining facility provided by the digital trust architecture 102 of FIG. 1 may enable items created by a user to become publicly available in a manner that is authenticated and irreversible. The block chaining of a special digital token 139 provides evidence that a specific transaction occurred, and specifically who was involved.

Figure 2:
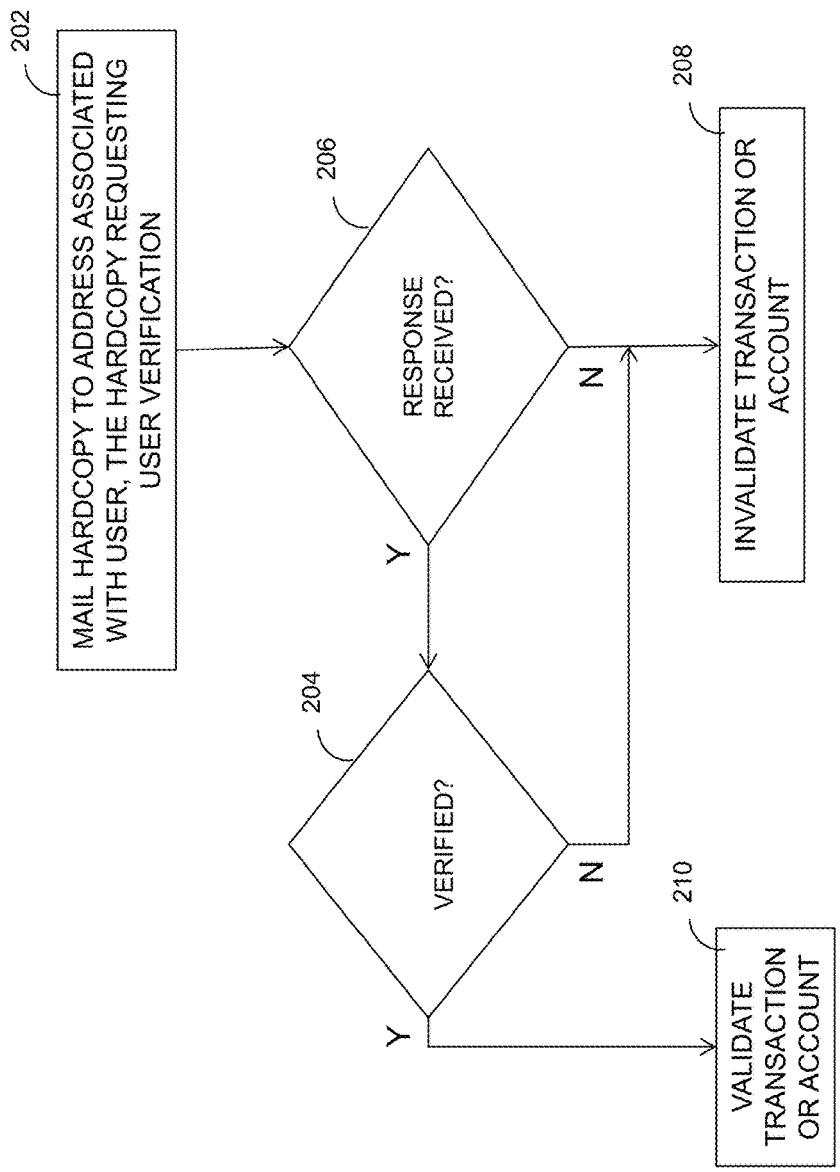
FIG. 2 is a flowchart illustrating a method that may be utilized to periodically validate user information in the system 100 discussed above with respect to FIG. 1.

FIG. 2 shows a method 200 that may be utilized to periodically validate user information in the system 100 discussed above with respect to FIG. 1. In some aspects, the method 200 may be performed by the quality check process 112 and/or the account enrollment process 106, discussed above with respect to FIG. 1. The process 200 may be performed periodically in some aspects. For example, the process 200 may be performed for IPP transactions that use "virtual" or kiosk or physical in person methods, to verify physical presence at a claimed address. In other examples, the process 200 may be performed on regular (e.g., once per month, or once per year) or on a random basis.

In block 202, a hardcopy (e.g., hardcopy enrollment verification form) is mailed to an address associated with a user. For example, the hardcopy may be mailed to an address stored in the user database 104, discussed below with respect to FIG. 4. The hardcopy may request user verification of information received during the account enrollment process 106, discussed above with respect to FIG. 1. In some aspects, the hardcopy may request verification of user information stored in the user database 104. For example, the hardcopy may request verification of an address, phone number, or other personal identifying information. In some circumstances, the hardcopy may request user verification of a particular transaction. In these aspects, the hardcopy may include one or more identifiers of the transaction. For example, one or more of a transaction identifier, a transaction description, a transaction business entity, or a transaction location may be indicated by the hardcopy. The hardcopy may also indicate a postal or email address for responding to the hardcopy and verifying or renouncing the transaction the hardcopy is attempting to verify. In some aspects, the hardcopy may provide a website address or text messaging phone number that may be used to provide a result of the verification.

Decision block 206 determines whether a response has been received to the hardcopy. In some aspects, the response may be in the form of a letter received at the return address specified in the hardcopy. For example, the response may be received in hardcopy form at a postal address indicated in the hardcopy, an email address indicated by the hardcopy, or via a web address indicated by the hardcopy. If a response has been received, process 200 moves to block 204, which determines whether the response affirms or verifies the verification requested in block 202. If the verification is affirmed, process 200 moves to block 210, which validates the transaction or account that was requested by the hardcopy of block 202. If the response does not verify the transaction or user information of block 202, then process 200 moves to block 208, which invalidates the transaction or account information. In some aspects, if the hardcopy requested verification of a transaction, the transaction may be canceled in block 208. For example, funds used for the transaction may be returned to their original payment account. Alternatively, if the hardcopy requested verification of user account information, the user account may be deleted and at least a portion of the information associated with the account may be erased. If the hardcopy requested verification of user data for a user account, the user account may be closed or at least placed in an inactive status as a result of the failure to verify the account.

Figure 3:
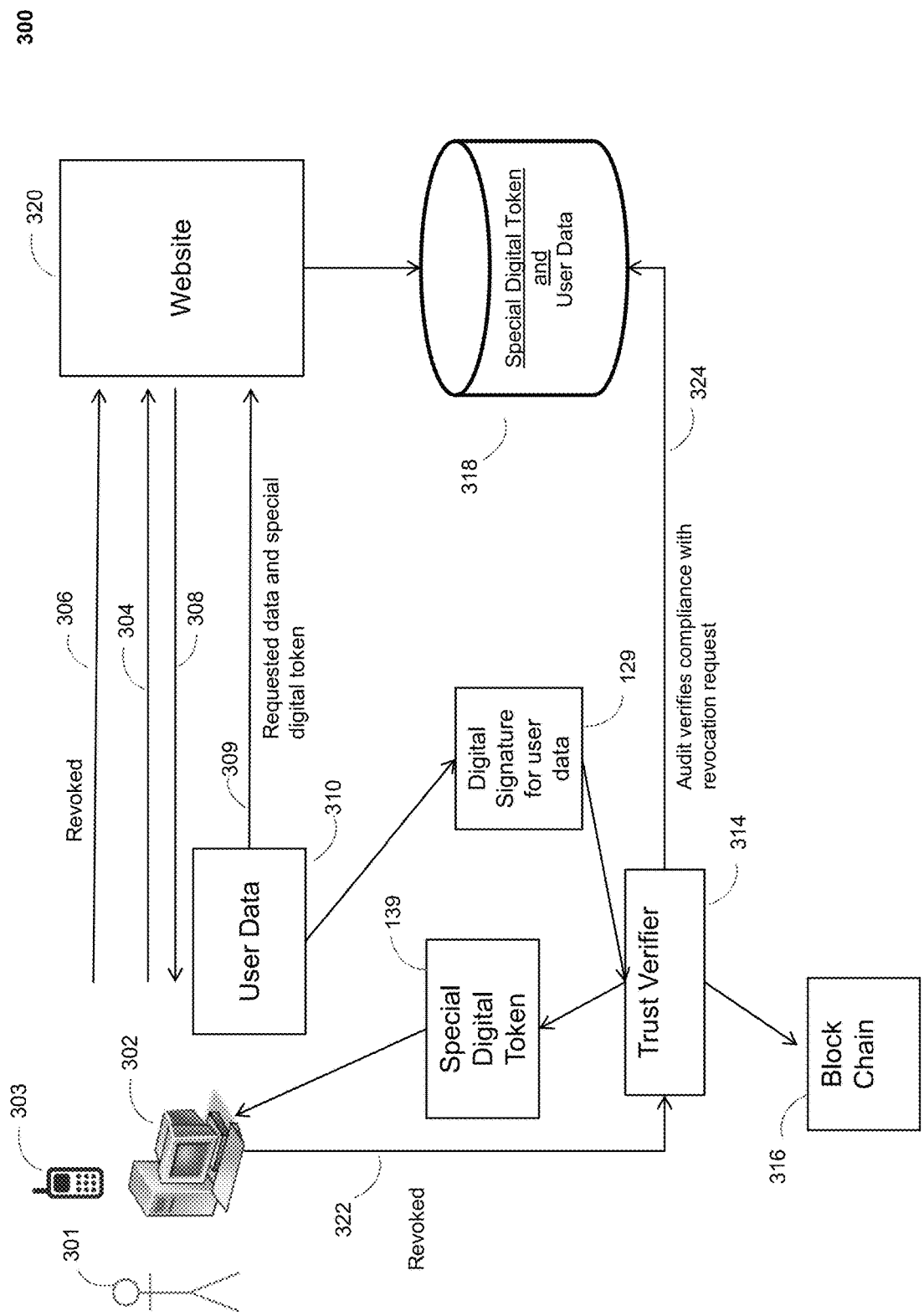
FIG. 3 is a system block diagram illustrating a voluntary method of controlling access to data, such as personal information.

FIG. 3 shows a voluntary model 300 of controlling access to data, such as personal information. The model 300 illustrated in FIG. 3 utilizes a special digital token to provide access to the data. The disclosed methods and systems provide a "license" for individual personal information to another service/system/or gaining party. This may provide an ability to regain control of personal attributes, to reduce ID theft and other misbehavior after personal data has been shared with a third party. In some aspects, a secure service provides an individual's personal attributes to third parties on behalf of the individual. This may enhance security. For example, the secure service may perform background investigations or other vetting on parties before they receive personal information.

In some aspects, each of the trust verifier 314, block chain 316, and website 320 may include electronic processing circuits, including in some aspects, one or more of the hardware processors, executing instructions that configure the one or more hardware processors to perform one or more of the functions described below.

The model 300 begins with a user 301, via their computer 302 or mobile device 303, accessing, via a network message 304, a website 320. In some aspects, the mobile device 303 may be a cellular phone, smart phone, tablet, or other mobile computing device capable of networked communication. The website 320 may request, via a network message 308, certain user data as a condition of registration of the user or to use an offered service. A special digital token 139 may be created using digital cryptographic processes involving the requested information 310, the private key 132 of the user, and the trust architecture verifier's digital token 139 as discussed above with respect to FIG. 1. The user 301 digitally signs the requested data and sends the signature 129 for the requested data to the verifier. The verifier signs the data to create the special digital token 139, returns the token to user 301 (via devices 302 and/or 303), and may record the token in block chain 316. The user 301 then submits, via their computer 302 or mobile device 303, the requested user data 310 along with a special digital token 139 to the website 320 via network message 309.

In some aspects, the web site 320 may store the user provided data 310, identified with the special digital token 139. Many events may occur that may cause the termination of a relationship between the user 301 and online services provided by the website 320. For example, the website 320 may no longer provide the service. Or the website 320 may no longer be operating under the same privacy provisions that were in affect at the time of initial registration. In the event the user 301 wishes to revoke the permission of the website 320 to use previously provided user data 310, user 301 may, via their mobile device 303 or computer 302, revoke the rights previously permitted under the special digital token 139 by informing the web site 320 and the trust verifier 314. The mobile device 303 or computer 302 may be configured to send a revoke message 306 to the website 320 and message 322 to the trust verifier 314 to accomplish this.

The trust verifier 314 may then record the revocation in block chain 316. Web site 320 may then remove data associated with the special digital token 139 from their data store 318. Representatives of the trust verifier 314 may later audit web site 320 and/or its data store 318 to determine if the user data 310 associated with the special digital token 139 was revoked. This voluntary process may restore rights of the user 301 to control their data and may be implemented in many ways. For example, it may be a condition for allowing activities to be conducted on a specific domain. Another example is it could be done to enhance a brand commitment to user privacy. Or it could be a condition imposed by regulation or as a legal remedy.

Figure 4:
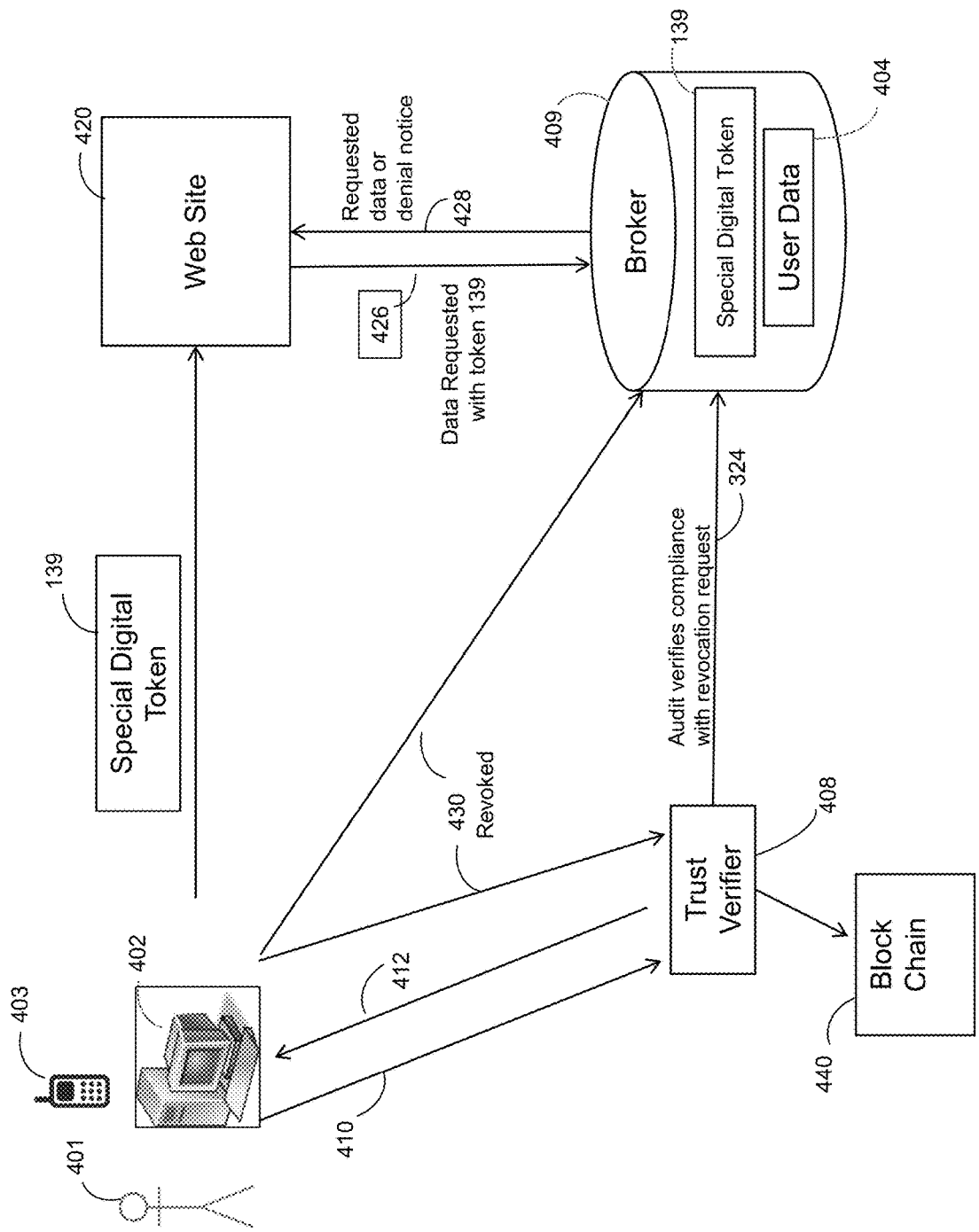
FIG. 4 is a system block diagram illustrating a brokered model of access to personal information (PI).

FIG. 4 shows a brokered model 400 of access to personal information (PI). The brokered model 400 of FIG. 4 shares some similarities with the voluntary model 300 described above with respect to FIG. 3. For example, the brokered model 400 includes a user's computer 402 or mobile device 403. The user 401 may have requested a special digital token 139 to be used with personal information (PI) 404 by sending message 410 to the trust verifier 408, and received a special digital token 139 via message 412. However, while in the voluntary model 300 of FIG. 3 the user 301, via their computer 302 or mobile device 303, provides a copy of the data 310 with the special digital token 139, in the brokered model 400 of FIG. 4, only the special digital token 139 is provided to the third party website 420. The subject data 404 is sent to the data broker 409. In some aspects, the data broker 409 may already have the data, retained from previous submissions. When the website 420 needs to access the data 404, the website 420 submits a request 426 to a data broker 409, providing the special digital token to identify the data for which access is requested.

Upon receipt of the data request 426 and the special digital token 139, the data broker 409 may check the validity of the special digital token 139 with the trust verifier 408, and what type of access it authorizes for the website 420. The data broker 409 may then provide the data via message 428 if the special digital token 139 indicates the access is allowed, or an indication that the request has been denied. The website 420 may then operate on the data included in the response 428. However, the website 420 may not store a local copy of the data 404 to a stable storage. Instead, if the web site 420 requires access to the data 404 again at a later time, the website 420 may issue a second access request 426 to the data broker 409. If at any time after the special digital token 139 is provided to the website 420, the user 401 determines that access to the data 404 by the website 420 is no longer desirable, the user 401 may, via their computer 402, send a revoke command 430 to the broker 409 and the trust verifier 408. Upon receiving the revoke command 430, the broker 409 may not provide access to the data 404. The trust verifier 408 will respond to the user 401 with confirmation 412.

Thus, in the brokered model 400, a third party consumer of personal information (PI), such as the website 420, may not store a local copy of PI, such as data 404, as was the case in FIG. 3 with the website 320 storing a local copy of the data 310. In contrast, with the brokered model 400 of FIG. 4, all access to data is provided via a broker 409. In some aspects, the broker 409 may be provided by the same entity as the trust verifier 408. In some aspects, a block chain 440 may be used by the trust verifier 408 to record and store status data. In some aspects, the trust verifier 408 may perform an audit function 324 to monitor compliance as described above and depicted in FIG. 3.

The brokered model 400 illustrated in FIG. 4 may be utilized, for example, to provide shipping information to an online merchant. For example, a customer (e.g., user 401) may initially establish an account with a data broker 409 as described above. The establishment of the account may provide a license for the data broker 409 to provide personal information for the user 401 to third parties under particular conditions. Once the account is established, the user 401 may make an online purchase. The merchant from which the online purchase was made may contact the data broker 409 and request a shipping address for the user 401. In this embodiment, the data broker 409 provides a copy of the requested address, along with a special digital token 139 (e.g., an EPM®) for the requested address, including an expiration date and possibly other use restrictions.

Figure 5:
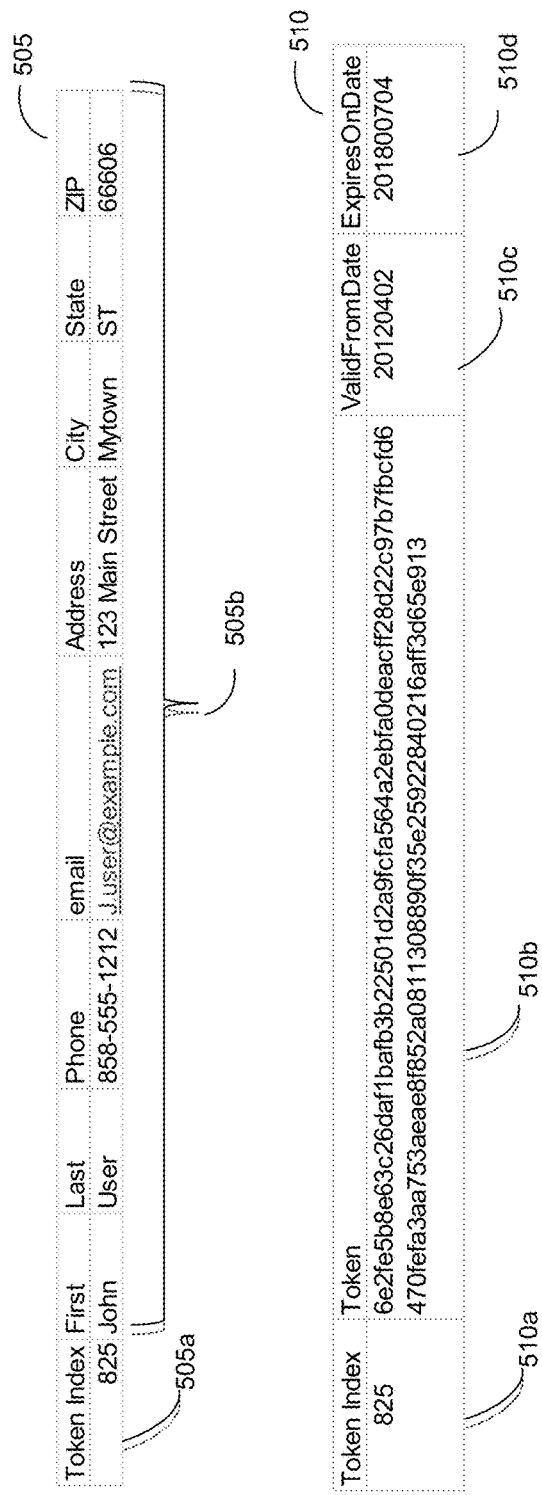
FIG. 5 shows a database table organization that associates a special digital token with a set of personal information (PI).

FIG. 5 shows a database table organization that associates a special digital token 139 with a set of personal information (PI). The database table organization 500 includes two tables, a PI table 505 and a special digital token 139 table 510.

The PI table 505 may store one or more items of personal information 505b. As illustrated, some examples of personal information include name, address, phone number, email address, etc. The PI table 505 may also include an index column 505a identifying the special digital token 139 in table 510 that has signed the personal information in the personal information table 505.

The token table 510 identifies an index 510a, the special digital token itself via column 510b, a valid from date 510c, and an expiration date 510d. Information associated with a particular token 139 and included in the token table 510 may vary by embodiment. For example, some aspects may provide a parameter indicating whether access controlled by the token 139 will be revoked when terms of use of the personal information is revised. For example, if a third party changes their terms of use, this may cause automatic revocation of access to some personal information. Some aspects of the token table 510 may include a column indicating whether access provided by the token 139 should be renewed only when a notice is provided to the user of the renewal.

Some embodiments may place use restrictions on the PI controlled by the special digital token 139. For example, in some aspects, the table 510 may include a column indicating whether the PI can be utilized for any use, or for medical applications only.

In some aspects, a consumer of personal information protected by a special token 139 may provide PI to a facility that enables a user to revoke access to previously provided PI. Furthermore, in some aspects, the consumer of PI verifies its use of PI is authorized via the special token 139 in the token database table 510 before each access of the PI, or for all access within a predetermined period of time. In some aspects, after access rights to particular PI end, the consumer of PI may retain records of the PI along with the associated identification of the token 139. This may be provided for auditing functions to be performed. For example, an audit may verify that access to the PI complied with requirements of the system.

Figure 6:
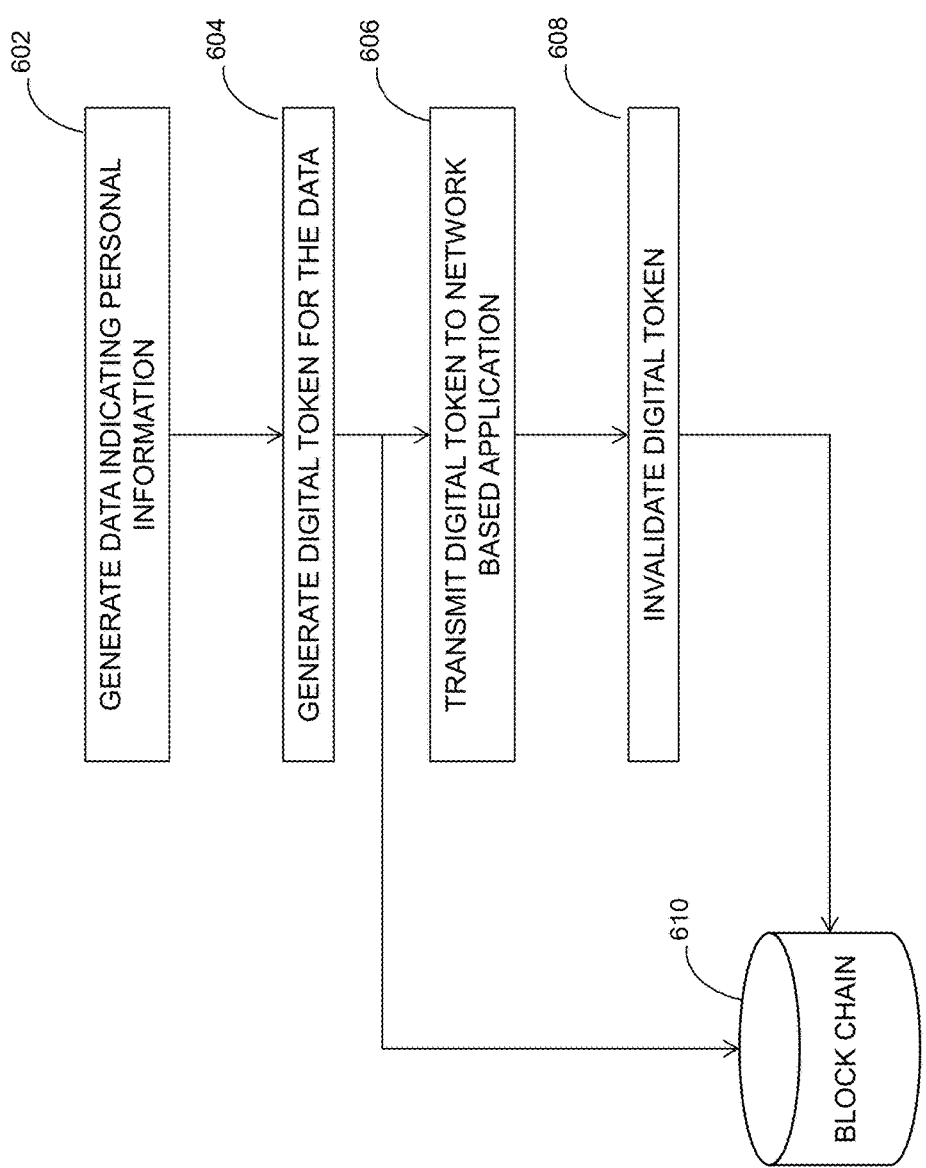
FIG. 6 is a flowchart of one method of managing access to personal information.

FIG. 6 is a flowchart of one method or process 600 of managing access to personal information. In some aspects, the process 600 of FIG. 6 may be performed by a user's computer, such as the user computer 302 or user computer 402 or user mobile device 303 or user mobile device 403 discussed above with respect to FIGS. 3-4.

In block 602, data indicating personal information is generated. In some aspects, the data may indicate one or more of a first name, last name, middle name or initial, phone number, email address, postal address, data or birth, social security number, password, user name or other personal information.

In block 604, a special digital token 139 is generated for the data. Generating a special digital token 139 may include digitally signing the data with a private key. In some aspects, the digital token 139 is recorded in a block chain 610. In some aspects, the generating of a token 139 may include interfacing with a network based API that provides tokens 139. For example, in some aspects, a service oriented interface may be provided. A request for a token 139 may be made to the service oriented interface, the request including the data or providing a reference for the data. A response from the service oriented interface may provide a token 139 for the data.

In block 606, the special digital token 139 is transmitted or otherwise shared with a network based application. In some aspects, the network based application may be controlled and/or managed by a third party separate from the user generating the personal information in block 602. The third party may self-arbitrate its access to the personal information generated in block 602 via the special digital token 139. For example, the special digital token 139 may indicate a valid data range for access. If the current date is within the valid date range, then the third party web application may access the personal information, but if the current date is outside the range, then the third party application may voluntarily refrain from accessing the personal information.

In some aspects of block 606, the data may also be transmitted to the network based application. For example, in the voluntary data model 300 discussed above with respect to FIG. 3, the special digital token 139 and the associated data may be provided to the web based application.

In block 608, the special digital token 139 may be invalidated. In some aspects, block chain 610 may be updated to record the token 139 status as invalid. Invalidation of a special digital token 139 may be provided, in the brokered model 400 discussed above with respect to FIG. 4, by transmitting a revoke command message 430 from the user 401 or user's computer (402 or 403), to the broker 409. In some aspects, invalidation of the special digital token 139 may be performed in response to an event, such as a determination to cease a relationship with the network based application, or to terminate use or a contract with the web based application.

Figure 7:
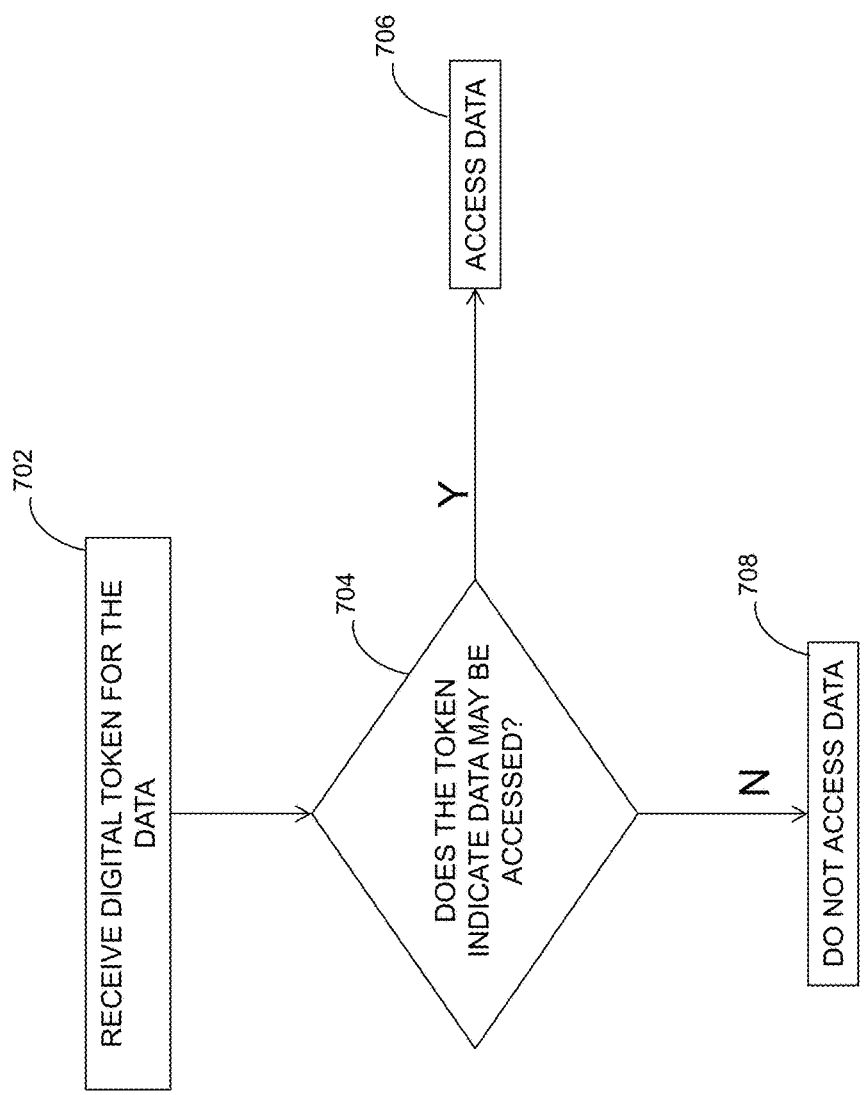
FIG. 7 is a flowchart of a process of accessing data protected by a special digital token.

FIG. 7 is a flowchart 700 of a process of accessing the data associated with the special digital token 139. In some aspects, the process 700 discussed below with reference to FIG. 7 may be performed by the web application or website 320 or 420, discussed above with respect to FIGS. 3 and 4 respectively. For example, in some aspects, instructions stored in an electronic hardware memory may configure an electronic hardware processor to perform one or more of the functions discussed below with respect to process 700.

In block 702, a special digital token 139 is received. In some aspects, the token 139 received in block 702 is used to control access to user data. The user data may include one or more elements of personal information (PI) such as a first name, last name, middle name, postal address, email address, phone number(s), social security number, or other personal information.

In some aspects, the user data itself may also be received in block 702. In some aspects, the token 139 and the user data (if received) may be received from a data store, such as a stable storage. In some aspects, the token 139 and/or the data may be received from a network, for example, via a network connection to a network attached storage, or via a network connection to the user's computer.

Decision block 704 determines whether the token 139 indicates that data may be accessed. In some aspects, block 704 may determine whether the token 139 is valid for a current date. For example, the token 139 may provide an indication of a valid date range, such as a "valid to" date and a "valid until" date.

Depending on the indications of the special digital token 139, process 700 alternatively moves to block 706, where the data is accessed, or block 708, which denies access to the data. In some aspects, block 708 may also erase or otherwise destroy any local copies of the data.

FIG. 8 is a structured block diagram of a computer system 800 implementing one or more of the exemplary embodiments disclosed herein. The device 805 includes an electronic hardware processor 815 and an electronic hardware memory 810. The electronic hardware processor 815 may be comprised of one or more physical hardware processors, which may be operably connected via one or more electronic busses in some aspects.

The electronic hardware memory 810 stores instructions that configure the electronic hardware processor 815 to perform one or more of the functions discussed herein. The memory 810 may store a user account enrollment module 812, key provisioning component 814, an email component 816, a data access component 818, a block chain component 820, and a directory component 822.

Instructions stored in the user account enrollment component 812 may configure the processor 815 to perform one or more user enrollment functions, such as those discussed above with respect to FIG. 1 and the account enroll process 102. For example, the user account enrollment component 812 may configure the hardware processor 805 to collect user account information and store the information in a database, such as the database 104. The user account enrollment component 812 may also establish the user account 114 as described in FIG. 1.

The user account enrollment component 812 may configure the electronic hardware processor 805 to receive user identity information, such as a name, phone number, address, social security number, and the like, from the user. The information may be received, as discussed above, from a web-based application or mobile application. The user account enrollment component may also receive information from the in person proofing component 813, discussed in more detail below, regarding results of an in person verification process. The user account enrollment component 812 may also configure the processor 815 to verify a user account based on the user identity information and the additional information received from the in person proofing component 813. The user account enrollment component 812 may also configure the processor 815 to provision a user account based on the user identity information.

In some aspects, the user account enrollment component 812 may configure the processor to receive input identifying the recipient and input indicating email body data, search the database accessible to the public for a public key associated with the recipient, encrypt the email body data using the public key associated with the recipient, and transmit the encrypted email body data to the recipient.

In some aspects, the user account enrollment component 812 may configure the processor 815 to receive input indicating whether information indicating the transmission of the encrypted email body data is to be stored in a block chain; and store the information in a block chain in response to the input. In some aspects, the user account enrollment component 812 may configure the processor 815 to receive visibility input indicating whether the information stored in the block chain is publicly accessible; and set access privileges of the block chain in response to the visibility input. In some aspects, the user account enrollment component 812 may configure the processor 815 to perform one or more of the functions associated with the account enroll process 102 discussed above with respect to FIG. 1.

The in person proofing component 813 may be configured to receive at least a portion of the user identity information from the user account verification component, generate a prompt for additional user identity information, receive input from an input device indicating the additional user identity information; and transmit the additional user identify information to the user account verification component. For example, the in person proofing component 813 may configure the processor 815 to perform one or more of the functions discussed above with respect to the account in person verification process 106.

Instructions in the key provisioning component 814 may configure the electronic hardware processor 815 to generate a public and private key for the user account on the user's system. In some aspects, the key provisioning component 814 may be configured to selectively publish the public key to a database accessible to the public based on configuration information.

Instructions in the user email component 816 may configure the processor 815 to generate an email from the user, sign the email using the private key, and transmit the email to a recipient. For example, the user email component 816 may configure the processor 815 to perform one or more of the email functions discussed herein, for example, by the email components 114 and/or 116 discussed above. Instructions in the data access component 818 may configure the processor 815 to identify sensitive data, grant permission to access the sensitive data, and revoke access to the sensitive data. For example, the data access component 818 may configure the processor 815 to perform one or more of the functions discussed above with respect to FIG. 4. The block chain component 820 may configure the processor 815 to receive records from the user and add records to a block chain. For example, the block chain component 820 may configure the processor 815 to perform one or more of the functions associated with the trust verifier 314 and 408 discussed above with respect to FIG. 3 and FIG. 4, and in recordation functions discussed above in FIG. 6. Instructions in the directory component 822 may configure the processor 815 to search and retrieve data associated with enrolled users, such as public keys used for various services, and shared information.

Those of skill will recognize that the various illustrative logical blocks, modules, circuits, and algorithm steps described as follows, and in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and writes information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system.

Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS®, iOS®, Android® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

What is claimed is:

1. A digital trust architecture system comprising:
a hardware processor configured to:
receive, from a network, a request to create an account for a user;
verify the user account for the user based on user identity information, the user identity information comprising a first item of user information received when the user is at a first location and a second item of user information received when the user is at a second location where the second item of user information is verified in-person, wherein the first location is different from the second location;
associate the user account with an electronic key;
identify electronic data regarding the user, wherein the electronic data is to be communicated electronically with respect to a transaction involving the user;
sign the electronic data based on the electronic key;
convey the electronic data over the network to a recipient associated with a recipient device;
receive input identifying the recipient associated with the recipient device and input indicating the electronic data,
search for a public key associated with the recipient, wherein the electronic key comprises, at least in part, the public key, and
encrypt the electronic data with the public key;
receive input indicating that the encrypted electronic data is to be stored in a blockchain; and
store the encrypted electronic data in the blockchain in response to the input; and
a memory configured to store the user identity information, the user account, and the electronic key.

2. The system of claim 1, wherein the hardware processor is further configured to receive the first item of user information from a user device and the second item of user information from an in-person verification device via the network.

3. The system of claim 1, wherein the hardware processor is further configured to:
generate a prompt to an in-person verification system for the second item of user identity information, and
receive the second item of user identity information in response to the generated prompt.

4. The system of claim 1, wherein the hardware processor is further configured to:
receive a visibility input indicating whether the information stored in the blockchain is publicly accessible, and
set access privileges of the blockchain in response to the visibility input.

5. The system of claim 1, wherein the hardware processor is further configured to selectively publish a public key associated with the user to a publicly accessible directory database.

6. The system of claim 1, wherein the hardware processor is further configured to:
generate a digital signature for the electronic data, and
invalidate the digital signature based on revoking access to the electronic data.

7. A method implementing a digital trust architecture, the method comprising:
receiving, by a processor, from a network, a request to create an account for a user;

verifying by a processor, the user account for the user based on user identity information, the user identity information comprising a first item of user information received when the user is at a first location and a second item of user information received when the user is at a second location where the second item of user information is verified in-person, wherein the first location is different from the second location;

associating, by a processor, the user account with an electronic key;

identifying, by a processor, electronic data regarding the user, wherein the electronic data is to be communicated electronically with respect to a transaction involving the user;

signing, by a processor, the electronic data based on the electronic key;

conveying, by a processor, the electronic data over the network to a recipient associated with a recipient device;

receiving input identifying the recipient associated with the recipient device and input indicating the electronic data;

searching for a public key associated with the recipient, wherein the electronic key comprises, at least in part, the public key; and encrypting the electronic data with the public key receiving input indicating that the encrypted electronic data is to be stored in a blockchain;

storing the encrypted electronic data in the blockchain in response to the input; and storing, in a memory the user identity information, the user account, and the electronic key.

8. The method of claim 7, further comprising, receiving the first item of user information from a user device and the second item of user information from an in-person verification device via the network.

9. The method of claim 7, further comprising:
generating a prompt to an in-person verification system for the second item of user identity information, and
receiving the second item of user identity information in response to the generated prompt.

10. The method of claim 7, further comprising:
receiving a visibility input indicating whether the information stored in the blockchain is publicly accessible, and
setting access privileges of the blockchain in response to the visibility input.

11. The method of claim 7, further comprising selectively publishing a public key associated with the user to a publicly accessible directory database.

12. The method of claim 7, further comprising:
generating a digital signature for the electronic data; and
invalidating the digital signature based on revoking access to the electronic data.

* * * * *